March 10, 1942.  C. A. TAYLOR  2,275,701
DOG LEASH
Filed Jan. 17, 1941   2 Sheets-Sheet 1

Inventor
Charles Andrew Taylor

By Clarence A. O'Brien

Attorney

March 10, 1942.   C. A. TAYLOR   2,275,701
DOG LEASH
Filed Jan. 17, 1941   2 Sheets-Sheet 2
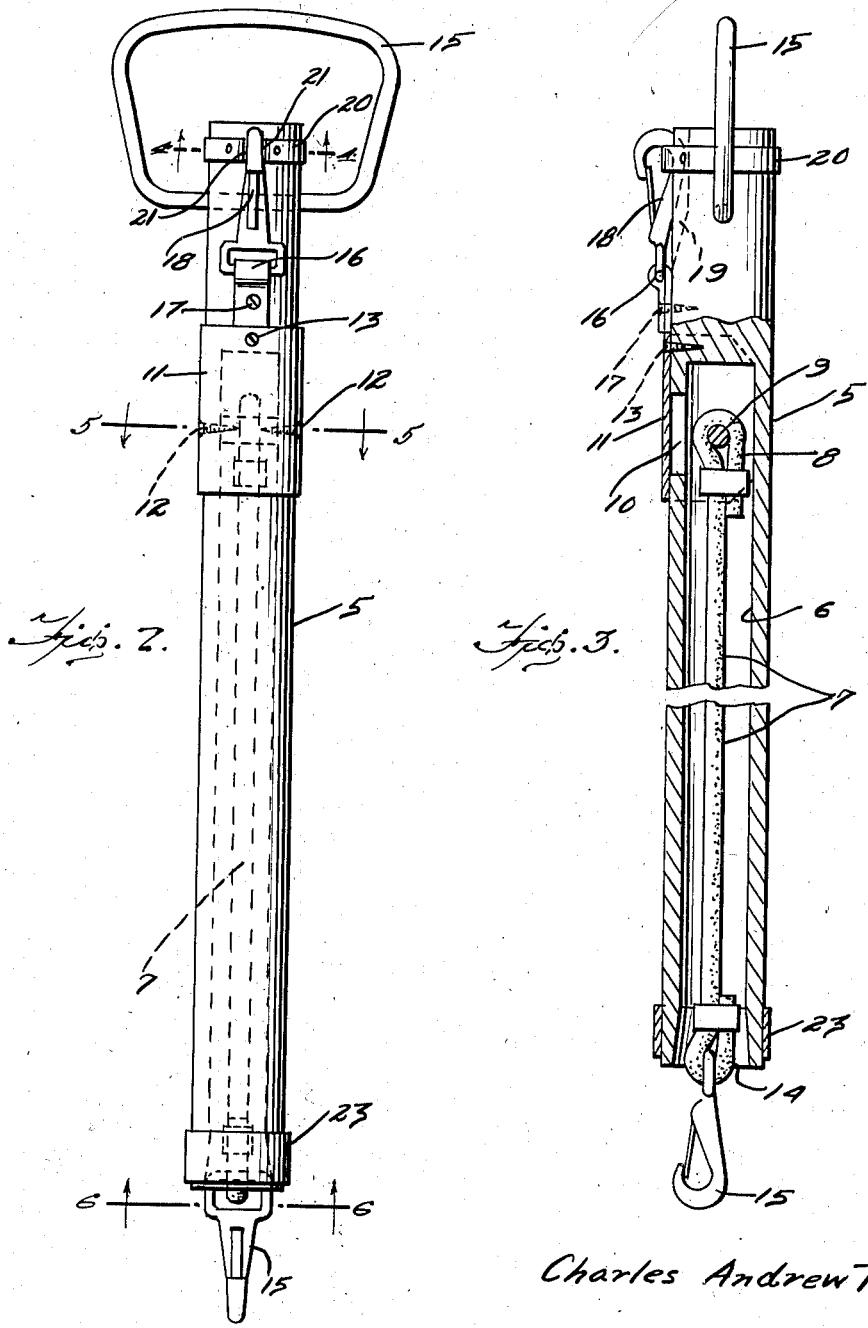
Inventor
Charles Andrew Taylor
By Clarence A. O'Brien
Attorney Patented Mar. 10, 1942

2,275,701

UNITED STATES PATENT OFFICE 2,275,701

DOG LEASH

Charles Andrew Taylor, Indianapolis, Ind., assignor of twenty percent to Harry Yanthis, Jr., and twenty percent to Alvia B. Coleman, both of Indianapolis, Ind.

Application January 17, 1941, Serial No. 374,936

4 Claims. (Cl. 119—109)

This invention relates to dog leashes and among the objects of the invention are to provide an animal leash embodying an elastic lead strap in association with a casing therefor and which substantially houses the strap when the latter is in its retraced condition; together with means associated with the strap for detachably connecting one end thereof with the harness of the animal, and means associated with the casing for the strap to provide a quick, anchoring means when it is desired to tie the animal to an anchor, such as in an automobile, to a ring or the like suitably secured within the automobile, or to a ring or the like secured to a stake or post.

Further an object of the present invention is to provide a dog leash which, while extensible and retractable, is free of reels and the like which tend to increase the details of the same as well as the number of working parts that are likely to easily get out of order.

The invention together with its objects and advantages will be best understood from a study of the following description taken in connection with the accompanying drawings wherein—

Figure 2 is an elevational view of the leash.

Figure 3 is a longitudinal sectional view through the leash with certain parts shown in elevation.

Figure 5:
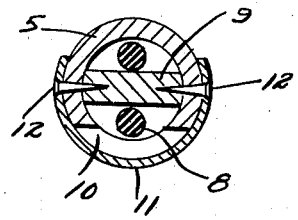
Figure 4:
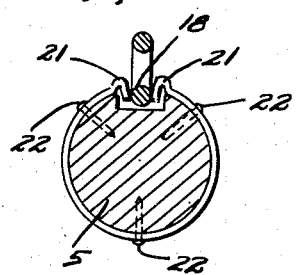
Figure 6:
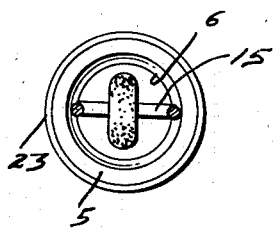

Figures 4, 5 and 6 are detail sectional views taken substantially on the lines 4—4, 5—5 and 6—6, respectively, of Figure 2.

Referring more in detail to the drawings it will be seen that in the preferred embodiment thereof the leash comprises a tubular member 5 having an axial bore 6 that opens through one end of the tube so that the tube serves as a casing for the leash strap 7.

The strap 7 is formed from a single length of round rubber material and has one end secured in the form of an eye as shown and anchored within the tube 5 at the inner end of the bore 6 through the medium of a transverse anchor pin 9.

Access to the interior of the casing formed by the tubular member 5 in the region of the pin 9 may be had through an opening 10 provided in the periphery of the member 5 as shown.

The opening 10 is normally closed through the medium of a semi-cylindrical plate 11 preferably of metal, and secured in position on the member 5 through the medium of oppositely disposed nails or similar fastening elements 12 and a nail or similar fastening element 13.

As clearly shown in Figure 5 the nails or other fastening elements 12 also serve to secure the anchoring pin 9 in position within the bore of the member 5.

The free end of the leash strap 7 is formed to provide an eye 14 through the medium of which a conventional snap fastener 15 is secured to said end of the strap; the clasp 15 being adapted, as is well known, to cooperate with a ring associated with the harness of the animal for detachably securing the leash strap to said harness.

Figure 1:
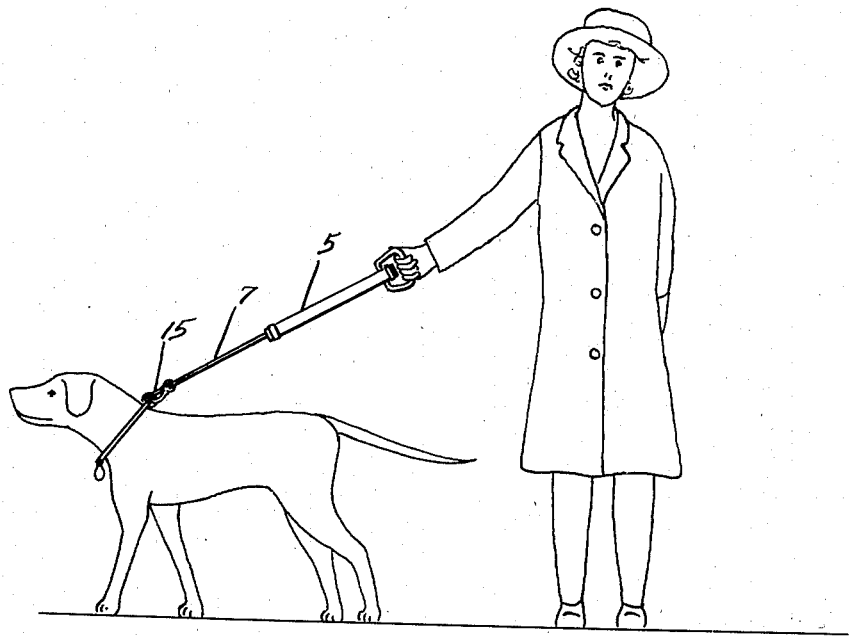
Figure 1 is a view illustrating the use of the leash.

The member 5 is provided at the end remote from the open end of the bore 6 with a handle 15 of metal or other suitable material to provide a handgrip for the user, as clearly shown in Figure 1.

Also hingedly secured to this last-mentioned end of the member 5, and through the medium of a hinge strap 16, secured as at 17, to the member 5, is a snap fastener 18 that is adapted to be engaged with a ring or other complemental member secured within an automobile body, or to a post or stake when it is desired to anchor the leash to such an anchor-serving means to confine the activity of the animal on the end 15 of the leash to a certain or restricted area.

When not in use the snap fastener 18 is accommodated in a suitable groove 19 provided therefor in the member 5 and is retained in the groove 19 through the medium of a spring clip 20.

The clip 20 is preferably in the form of a split metallic band that embraces the member 5 as shown and has the ends thereof formed by said split bent radially outwardly and then reversely bent as clearly shown in Figure 4 to provide opposed jaws 21 that engage the shank of the snap fastener 18 as also shown in said Figure 4, for releasably retaining the snap fastener 18 seated within the aforementioned groove 19.

The band 20 is secured in position on the member 5 through the medium of nails or other suitable fastening elements 22.

Completing the device and adding to the finished appearance of the same is a band 23 that is disposed about the tube 5 at the end thereof remote from the clip 20.

In using the leash for walking or otherwise exercising the dog or other animal, the snap fastener 15 is engaged with the ring usually provided on the collar or harness of such animal and the leash is gripped by one hand of the user at the handle 15 as shown in Figure 1.

Obviously the pull of the dog on the leash strap 7 will cause the same to be extended as suggested, and consequently, when in use, the strap 7 is retained in a taut condition and therefore will not wrap around the legs of the animal, the person, or the stake, or other anchoring device at the handle-equipped end of the tubular member 5 of the leash.

Also, when tension on the strap 7 is released, as when the end 15 thereof is disconnected from the harness or collar on the dog or other animal, the strap 7 will contract into the casing 5 and by the casing be protected to a material extent, when not in use, from dirt, the elements, and the like as would have a deteriorating effect on the elasticity of the strap.

It is thought that the construction, utility and simplicity of a leash embodying the features of the present invention will be had without further detailed description thereof.

It is also to be understood that while I have herein illustrated and described the preferred embodiment of the invention, I claim all such forms of the invention to which I am entitled in view of the prior art and scope of the appended claims.

Having thus described the invention what is claimed as new is:

1. In an animal leash, a casing for normally housing a leash strap, said casing having an external groove in the peripheral wall thereof, a snap fastener hinged to the casing exteriorly thereof for tethering purposes and adapted to seat within said groove, and a resilient clip mounted on the casing and engageable with the snap fastener for releasably retaining the latter seated within said groove.

2. An animal leash embodying a casing part, a snap hook for tethering purposes pivoted to said casing part, and a split angular clip embracing said casing part and provided at the ends formed by the split therein with jaws releasably engageable with the snap fastener for retaining the same in a predetermined position on said casing part and against free movement relative to said casing part.

3. In an animal leash of the character described, a handle equipped part provided with an external groove, a snap fastener pivoted to said handle equipped part in the region of said groove and adapted to seat in the groove, and opposed spring jaws mounted on said handle equipped part at opposite sides of the groove and engageable with said fastener for releasably retaining the same seated in said groove.

4. An animal leash comprising an elongated tubular casing, a transverse anchor pin disposed within the casing, an elastic leash strap provided at one end thereof with an eye engaged with said anchor pin for anchoring one end of the leash strap inwardly of the casing, and said casing, in the region of said pin, having an opening in the peripheral wall thereof to facilitate access to the anchor pin, and a plate member secured to said casing and normally closing said opening.

CHARLES ANDREW TAYLOR.